United States Patent [19]

Voza

[11] Patent Number: 4,499,838
[45] Date of Patent: Feb. 19, 1985

[54] PATTERN DATA STORAGE BY EQUATIONS IN AN ELECTRONICALLY CONTROLLED SEWING MACHINE

[75] Inventor: Alfonse N. Voza, Jersey City, N.J.
[73] Assignee: The Singer Company, Stamford, Conn.
[21] Appl. No.: 646,889
[22] Filed: Sep. 4, 1984
[51] Int. Cl.³ .............................................. D05B 3/02
[52] U.S. Cl. ............................. 112/266.1; 112/158 E
[58] Field of Search ............. 112/262.1, 266.1, 158 E, 112/121.11, 121.12, 102, 103

[56] References Cited
U.S. PATENT DOCUMENTS 4,220,101 9/1980 Nanai et al. ...................... 112/158 E
4,222,339 9/1980 Iwako .............................. 112/158 E
4,325,315 4/1982 Totino et al. .
4,388,883 6/1983 Hirota et al. .
4,399,760 8/1983 Bergvall .

Primary Examiner—Peter Nerbun
Attorney, Agent, or Firm—David L. Davis; Robert E. Smith; Edward L. Bell

[57] ABSTRACT

To efficiently store the large amount of data required for the sewing of large embroidery patterns which are sewn along continuous paths, the path is divided into a plurality of contiguous segments and for each of the segments there is stored the length of the segment and its slope and rate of change of slope at the start of each segment.

2 Claims, 5 Drawing Figures

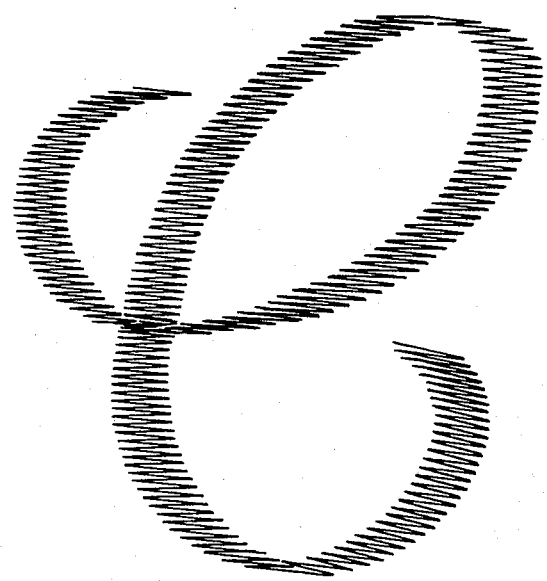
Fig. 3.
Fig. 5.
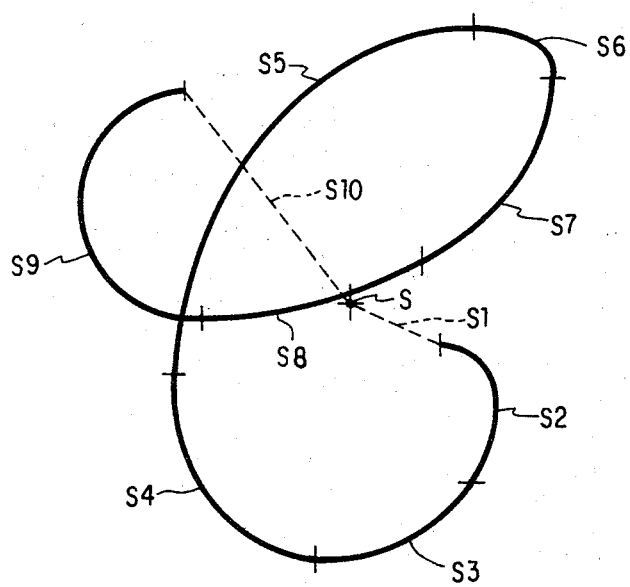
Fig. 4.

PATTERN DATA STORAGE BY EQUATIONS IN AN ELECTRONICALLY CONTROLLED SEWING MACHINE

BACKGROUND OF THE INVENTION

This invention relates to electronically controlled sewing machines and, more particularly, to the storage of pattern data in such a sewing machine.

In recent years, electronically controlled sewing machines have become increasingly more sophisticated, with the designer's imagination being virtually the only limitation on the type of pattern which can be sewn. However, one hardware limitation is the size of the memory available for storing pattern data. This becomes a serious problem in the case of embroidery patterns, or monograms, wherein a single pattern consists of a great number of densely packed stitches—some embroidery patterns containing several hundred stitches. If the data for each and every stitch were to be stored in the memory, the sewing machine would require an unreasonably large amount of memory space in order to store more than just a few of these patterns.

It is therefore a primary object of this invention to provide a more efficient way of storing pattern data.

Many monogram patterns may be considered to involve satin stitching over a continuous path. If this path could be expressed in terms of mathematical equations and if these equations were stored in the memory then it would be possible to reduce the amount of storage required for the pattern.

It is therefore another object of this invention to store pattern information in the form of mathematical equations defining the pattern.

However, to recreate the mathematical equations from stored information and to then derive signals for controlling the stitch forming instrumentalities involves very complex and time consuming computations which are not practical.

It is therefore a further object of this invention to provide the means whereby only simple computations are required to recreate a stitch pattern from stored information representing the pattern expressed in terms of mathematical equations.

SUMMARY OF THE INVENTION

The foregoing, and additional, objects are attained in accordance with the principles of this invention in an electronically controlled sewing machine capable of stitching along a continuous path to form a sewn pattern, the sewing machine including a memory and means for selectively retrieving information from the memory for controlling the stitch forming instrumentalities of the sewing machine, by providing a method for storing in the memory information sufficient to cause the sewing machine to stitch along the continuous path. The method comprises the steps of dividing the continuous path into a plurality of contiguous segments, providing for each of the segments in terms of two angularly related axes a second order equation defining each segment, and storing for each segment representations of the length of each segment and its slope and rate of change of slope at the start of each segment.

BRIEF DESCRIPTION OF THE DRAWINGS

The foregoing will be more readily apparent upon reading the following description in conjunction with the drawings wherein:

FIG. 3 shows an illustrative monogram pattern for which information may be stored in accordance with the principles of this invention;

FIG. 4 is a line drawing of the pattern shown in FIG. 3 illustrating how it may be divided into segments in accordance with this invention; and FIG. 5 shows an illustrative data storage format according to this invention.

DETAILED DESCRIPTION

Figure 1:
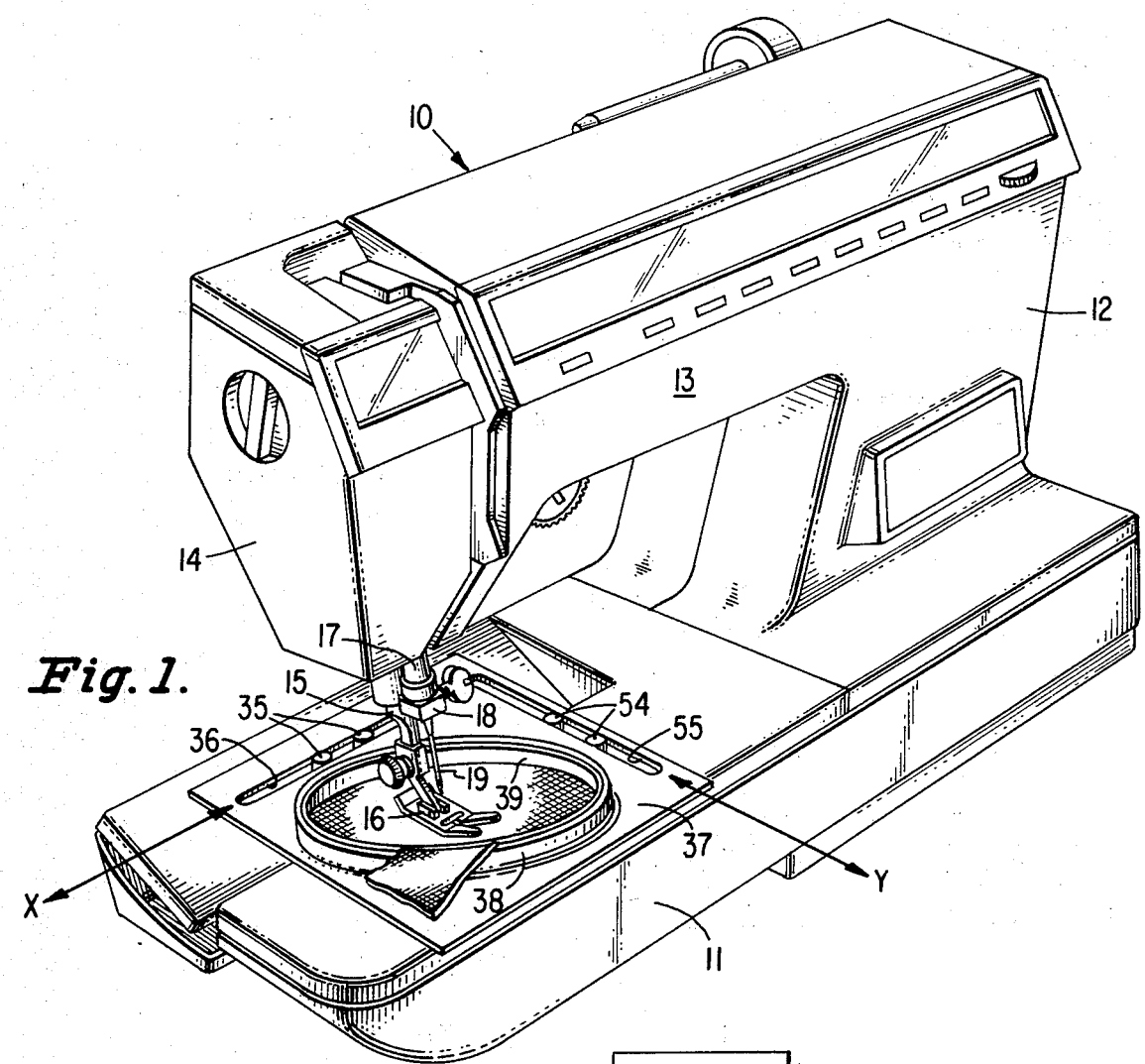
FIG. 1 is a perspective view of a sewing machine including a specialized embroidery attachment and in which sewing machine the present invention may be incorporated.

Referring now the drawings, wherein like elements in different figures thereof have the same reference character applied thereto, FIG. 1 illustrates a sewing machine fitted with an embroidery attachment and which is particularly well suited for the application of this invention. The embroidery attachment is fully disclosed in U.S. Pat. No. 4,386,573, which issued to Davidson et al. on June 7, 1983, the contents of which are hereby incorporated by reference as if fully set forth herein. The sewing machine, indicated generally as 10, includes a work supporting bed 11, a standard 12 rising from the bed, and a bracket arm 13 extending from the standard and terminating in a sewing head 14. A presser bar 15 to which a presser foot 16 is secured is carried in the sewing head and is biased toward the bed 11. An endwise reciprocable needle bar 17 also carried in the sewing head includes a needle clamp 18 by which a needle 19 is secured to the needle bar.

The embroidery attachment includes a work supporting frame 37 formed with a rimmed aperture 38 for accommodating a work fabric to be stitched and complemented by a clamp hoop 39 for securing the work fabric to the rimmed aperture. The frame 37 is formed with a straight slot 36 which is engaged by guide studs 35 and a straight slot 55 engaged by the guide studs 54. As disclosed in the referenced patent, the mechanism of the embroidery attachment cooperates with the sewing machine feed dog to move the guide studs 54 for motion in the X-direction and to move the guide studs 35 for motion in the Y-direction. The embroidery attachment is arranged so that for each and every stitch there is always one fixed increment of movement in the Y-direction, in one sense or the other, whereas in the X-direction there can be no movement or a fixed incremental movement in one sense or the other. Accordingly, the sewing machine 10 must provide to the embroidery attachment information as to the sense of movement in the Y-direction (only when there is a change of sense) and if there is to be movement in the X-direction, the sense of that movement.

Figure 2:
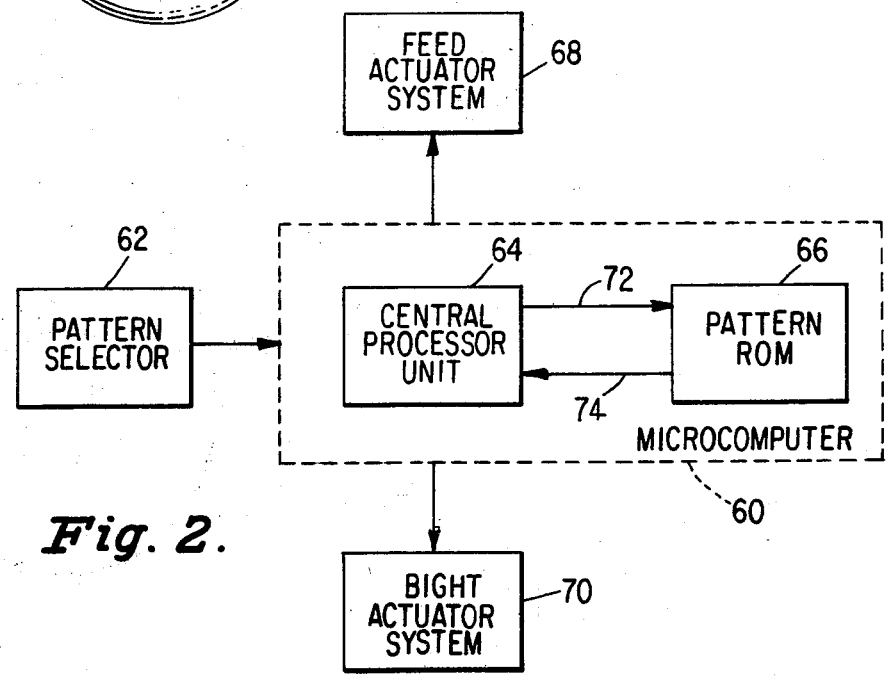
FIG. 2 illustrates a general block diagram of a microcomputer-based controller for the sewing machine of FIG. 1.

FIG. 2 illustrates a general block diagram of a typical microcomputer-based controller for an electronic stitch pattern sewing machine. In this controller, the microcomputer 60 receives input signals from the pattern selector 62 indicative of which pattern the sewing machine operator desires to be sewn. The microcomputer 60 includes an internal central processor unit (CPU) 64 and pattern ROM 66. The CPU 64 obtains from the pattern ROM 66, in timed relation with the operation of the sewing machine, data for controlling the feed actuator system 68 and the bight actuator system 70. The feed actuator system 68 and the bight actuator system 70 are similar in construction and are adapted to convert a digital code word from the microcomputer 60 into a mechanical position which locates the sewing machine needle bar 17 and provides a specified movement of the feed dog for each needle penetration. Within the microcomputer 60, the CPU 64 provides addresses to the pattern ROM 66 over the leads 72 and receives in return data over the leads 74.

For the embodiment illustrated in FIGS. 1-5 of the referenced U.S. Pat. No. 4,386,573, both the X and Y directions of movement are controlled by the work feed mechanism. The conventional work feeding stroke of the feed dog controls the X-direction and the up/down motion of the feed dog imparts fixed increments of motion in the Y-direction. An "abnormal" movement of the feed dog changes the sense of movement in the Y-direction.

FIG. 3 illustrates an illustrative monogram pattern which may be sewn according to this invention. The monogram pattern shown in FIG. 3 is the letter "C", which is sewn as a satin stitch over a continuous path. FIG. 4 illustrates this path and shows it divided into a plurality of contiguous segments. As will become apparent from the following discussion, each of the segments is approximated in terms of a second order equation. Therefore, the segments are chosen so that their rates of change of slope are constant over their lengths. To make the sewing operation simple for the user, all patterns start at the center of the work area. The first segment of the pattern positions the material from center to the actual starting location of the pattern. This segment is sewn with the needle bar latched. Thus, the path begins at a starting point S, skip stitches the segment S1, satin stitches the segments S2-S9, and skip stitches the segment S10 back to the starting point S. A curve fitter program is used to produce the equations of each segment.

To produce an attractive looking pattern the satin stitch density should be uniform; thus the distance between stitches in the Y-direction is fixed. Only the direction of the Y movement can be changed to sew up or down. If the equations for the data are stored as $X=f(Y)$ then the segments can be reconstructed by uniformly incrementing Y and calculating X.

When a stitch is made Y can be incremented. Using the equation for the current segment, the required X value can be calculated. The present X value would be subtracted from the required X value giving the required X movement for one stitch movement in the Y-direction. Since multiplication of the coefficients of the equations is not easily accomplished, this method was not used.

Instead the equations are "differentiated" and their first and second derivatives (actually delta values) are evaluated at the start of the segment. The delta values are stored along with the number of Y increments and the Y-direction. These four pieces of data represent an entire segment of a pattern. To sew the segment the delta values are used to determine the position of the next stitch penetration relative to the present location.

Absolute positions are not required, only relative moves from the last position. Since a segment must start where the previous one ends, the X-Y data for the segments can be shifted on the X-Y axes without changing the pattern. Shifting the segment around on the Cartesian coordinate system changes its equation but its derivatives remain constant. The first Y coordinate of the segment is subtracted from the remaining Y coordinates. This forces the first Y value to be 0 which is useful in calculating the delta values. The X data is shifted to center it around 0. This minimizes the magnitude of the X values which allows the curve fitter program to process the data faster.

The curve fitter program follows the standard mathematical defination of a function and produces equations in the form of $Y=f(X)$. To produce equations as $X=f(Y)$, the X-Y data is transformed to rotate the segment 90° clockwise by mapping $Y \to Xc$ and $X \to -Yc$. The curve fitter program is used to produce a second order polynomial fit.

The curve fitter produces an equation in the form of:

$$Yc = f(Xc) = C2'Xc^2 + C1'Xc + C0'$$

This must be rotated 90° counter clockwise using the inverse mapping $Xc \to Y$ and $Yc \to -X$.
Therefore, $$-X = C2'Y^2 + C1'Y + C0'$$

$$X = -C2'Y^2 - C1'Y - C0'$$

Let $$X = C2\ Y^2 + C1\ Y + C0$$

where $$C2 = -C2'$$

$$C1 = -C1'$$

$$C0 = -C0'$$

The equation of the segment must be "differentiated" to calculate the delta values.
Definition of a derivative:

$$\frac{dx}{dy} = \lim_{\Delta y \to 0} \frac{X(Y + \Delta y) - X(Y)}{\Delta y}$$

However, stitches are not length 0, they have a length of one satin stitch. The stitch length will always be $\pm 1$ Y increment to produce a uniform satin stitch density.
Definition of a delta value:

$$\frac{\Delta x}{\Delta y} = \lim_{\Delta y \to \pm 1} \frac{X(Y + \Delta y) - X(Y)}{\Delta y}$$

The first delta value is calculated from the equation for X and the Y direction. Substituting in the equation for X gives:

$$\frac{\Delta x}{\Delta y} = \lim_{\Delta y \to \pm 1} \frac{[C2(Y + \Delta y)^2 + C1(Y + \Delta y) + C0] - [C2Y^2 + C1Y + C0]}{\Delta y}$$

$$= \lim_{\Delta y \to \pm 1} \frac{C2Y^2 + 2C2Y\Delta y + C2\Delta y^2 + C1Y + C1\Delta y + C0 - C2Y^2 - C1Y - C0}{\Delta y}$$

-continued $$= \lim_{\Delta y \to \pm 1} \frac{2C2Y\Delta y + C2\Delta y^2 + C1\Delta y}{\Delta y}$$

$$= \lim_{\Delta y \to \pm 1} 2C2Y + C2\Delta y + C1$$

For the positive Y direction:

$$\frac{\Delta x}{\Delta y} = \lim_{\Delta y \to 1} 2C2Y + C2\Delta y + C1$$

$$= 2C2Y + C2 + C1$$

This is evaluated at the start of the segment. Since segments were previously shifted to start at Y=0, $$\frac{\Delta x}{\Delta y}\bigg|_{\substack{Y=0 \\ \Delta y = 1}} = C2 + C1$$

$$\Delta x = \Delta y(C2 + C1)$$

$$= C2 + C1$$

For the negative Y direction:

$$\frac{\Delta x}{\Delta y} = \lim_{\Delta y \to -1} 2C2Y + C2\Delta y + C1$$

$$= 2C2Y - C2 + C1$$

This is evaluated at the start of the segment:

$$\frac{\Delta x}{\Delta y}\bigg|_{\substack{Y=0 \\ \Delta y = -1}} = -C2 + C1$$

$$\Delta x = \Delta y(-C2 + C1)$$

$$= C2 - C1$$

In summary $$\Delta x = C2 + C1$$

for $\Delta y = 1$ $$\Delta x = C2 - C1$$

for $\Delta y = -1$

The first delta value will be called D1 and the Y direction YD. YD may equal $\pm 1$. Therefore, $D1 = C2 + C1 * YD$. The second delta value is calculated as:

$$\frac{\Delta^2 x}{\Delta y^2} = \lim_{\Delta y \to \pm 1} \frac{\frac{\Delta x}{\Delta y}\bigg|_{Y+\Delta y} - \frac{\Delta x}{\Delta y}\bigg|_{Y}}{\Delta y}$$

$$= \lim_{\Delta y \to \pm 1} \frac{\frac{[X(Y + 2\Delta y) - X(Y + \Delta y)]}{\Delta y} - \frac{[X(Y + \Delta y) - X(Y)]}{\Delta y}}{\Delta y}$$

$$= \lim_{\Delta y \to \pm 1} \frac{X(Y + 2\Delta y) - 2X(Y + \Delta y) + X(Y)}{\Delta y^2}$$

Substituting in the equation for X $$\frac{\Delta^2 x}{\Delta y^2} = \lim_{\Delta y \to \pm 1} \{[C2(Y + 2\Delta y)^2 + C1(Y + 2\Delta y) + C0] -$$

$$2[C2(Y + \Delta y)^2 + C1(Y + \Delta y) + C0] +$$

$$[C2Y^2 + C1Y + C0]\}/\Delta y^2$$

$$= \lim_{\Delta y \to \pm 1} \{C2Y^2 + 4C2Y\Delta y + 4C2\Delta y^2 + C1Y +$$

$$2C1\Delta y + C0 - 2C2Y^2 - 4C2Y\Delta y - 2C2\Delta y^2 -$$

$$2C1Y - 2C1\Delta y - 2C0 + C2Y^2 + C1Y + C0\}/\Delta y^2$$

$$= \lim_{\Delta y \to \pm 1} 2C2\Delta y^2/\Delta y^2$$

$$\frac{\Delta^2 x}{\Delta y^2} = 2C2$$

The second delta value will be called D2.

$$D2 = 2C2.$$

Note that D2 is a constant. It is independent of Y and of the Y direction. This is because a second order approximation is utilized.

To reconstruct the data, the following equations apply:

$$X(Y + \Delta y) = X(Y) + \Delta x$$

$$= X(Y) + \frac{\Delta x}{\Delta y} * \Delta y$$

where $\Delta y = \pm 1$ which is the Y direction.

$$X(Y + \Delta y) = X(Y) + \frac{\Delta x}{\Delta y} * YD$$

$$= X(Y) + D1$$

Similarly, $$\frac{\Delta x}{\Delta y}\bigg|_{Y + \Delta y} = \frac{\Delta x}{\Delta y}\bigg|_{Y} + \frac{\Delta^2 x}{\Delta y^2} * \Delta y$$

$$= \frac{\Delta x}{\Delta y}\bigg|_{Y} + \frac{\Delta^2 x}{\Delta y^2} * YD$$

$$= \frac{\Delta x}{\Delta y}\bigg|_{Y} + D2 * YD$$

However $D1 = \frac{\Delta x}{\Delta y} * YD$ $$\frac{\Delta x}{\Delta y} = \frac{D1}{YD}$$

-continued

Since $YD = \pm 1$, $\frac{\Delta x}{\Delta y} = D1*YD$.

$(D1*YD)|_{y+\Delta y} = (D1*YD)|_y + D2*YD$ $YD*(D1)|_{y+\Delta y} = YD*(D1)|_y + YD*D2$ $D1|_{y+\Delta y} = D1|_y + D2$ In summary, for every stitch made:

$Y = Y + YD$ $X = X + D1$ $D1 = D1 + D2$

By incorporating the Y direction into the calculation of the delta values, the reconstruction of the pattern segment has been reduced to three additions per stitch.

Data for each segment is stored in the ROM 66 in the format shown in FIG. 5. Thus, for each segment six bytes of data are stored. The first byte is a control word containing such information as whether that segment is sewn with the needle bar latched, the Y direction, whether that segment is the last segment for the pattern, etc. The next byte stores the number of moves (NM) for that segment. The following two bytes store the value of the second delta value (D2) and the last two bytes store the value of the first delta value (D1). All data is stored for one size pattern.

Thus, for each segment, all that need be stored is the Y-direction, the number of moves in the segment, and the values of the first and second delta values. All of this information is stored for a particular size pattern. In accordance with this invention, only a simple procedure is required to scale the pattern to a desired size. The following discussion describes how from the stored number of stitches and first and second delta values, these may be adjusted to sew a different size pattern. The shape of each of the segments are not changed, only their overall sizes and the satin stitch density is fixed so the stitch length cannot be changed. The scaling calculations are derived as follows:

Definitions of variables:
NM = the number of moves in a segment,
$\Delta y$ = the change in the Y-direction,
$\Delta x$ = the change in the X-direction,
YD = the Y direction = $\pm 1$,
D1 = the $\Delta x$ per move,
D2 = the change in D1 per move,
S = scale = new size/old size.
Subscripts:
O = old value,
N = new value or scaled value,
I = initial value at start of a segment,
F = final value at the end of a segment,
T = total value for the entire segment.
For the jth move:

$Y_j = Y_{j-1} + YD$, $X_j = X_{j-1} + D1_{j-1}$ $D1_j = D1_{j-1} + D2$

These equations are performed for NM moves. The length of a segment can be calculated by:

$Y_F = Y_I + YD*NM$, $Y_F - Y_I = YD*NM$, $\Delta y_T = YD*NM$.

For the original size $\Delta y_{OT} = NM_O * YD_O$.

for the new size $\Delta y_{NT} = NM_N * YD_N$.

Since the stitch length cannot be adjusted, $YD_O = YD_N$, therefore $\Delta y_{OT} = NM_O * YD$, and $\Delta y_{NT} = NM_N * YD$.

Dividing $\Delta y_{OT}$ by $\Delta y_{NT}$ yields $$\frac{\Delta y_{OT}}{\Delta y_{NT}} = \frac{NM_O * YD}{NM_N * YD} = \frac{NM_O}{NM_N}$$

$$NM_N = NM_O \frac{*\Delta_{NT}}{\Delta y_{OT}}$$

$NM_N = NM_O * S$

To maintain the shape of the segment, the slope of the new segment must equal the slope of the old segment at the same relative positions of the segments, i.e., $\frac{\Delta x/\text{stitch}}{\Delta y/\text{stitch}_N} = \frac{\Delta x/\text{stitch}}{\Delta y/\text{stitch}_O}$ at the beginning and end of both segments. This maintains the angle at which both segments start and end. The stitch length is held constant so $\Delta y/\text{stitch}_N = \Delta y/\text{stitch}_O$. Therefore $\Delta x/\text{stitch}_{NI} = \Delta x/\text{stitch}_{OI}$ so $D1_{IN} = D1_{IO}$.

To maintain the slope at the end of a segment $D1_{FN} = D1_{FO}$ $D1_j = D1_{j-1} + D2$
for NM stitches. Therefore, $D1_F = D1_I + NM*D2$.

Substituting in the above equation of $D1_{FN} = D1_{FO}$ $D1_{IN} + NM_N*D2_N = D1_{IO} + NM_O*D2_O$.

But $D1_{IN} = D1_{IO}$ $NM_N*D2_N = NM_O*D2_O$ $D2_N = D2_O*(NM_O/NM_N)$

Substituting in for $NM_N$ $$D2_N = D2_O * (NM_O/NM_O*S)$$

$$D2_N = D2_O/S$$

In summary, given the number of stitches in a segment and the initial first and second delta values, a segment with the same shape but of scale S can be calculated as follows:

$$NM_N = NM_O*S$$

$$D1_{IN} = D1_{IO}$$

$$D2_N = D2_O/S$$

Accodingly, there has been disclosed an improved method for the efficient storage of pattern data. It is understood that the above-described embodiment is merely illustrative of the application of the principles of this invention. Numerous other embodiments may be devised by those skilled in the art without departing from the spirit and scope of this invention, as defined by the appended claims.

I claim:

1. In an electronically controlled sewing machine capable of stitching along a continuous path to form a sewn pattern, said sewing machine including a memory and means for selectively retrieving information from said memory for controlling the stitch forming instrumentalities of the sewing machine, a method for storing in said memory information sufficient to cause said sewing machine to stitch along said continuous path comprising the steps of:
    (a) dividing said continuous path into a plurality of contiguous segments;
    (b) providing for each of said segments in terms of two angularly related axes a second order equation defining said each segment; and
    (c) storing for each of said segments representations of the length of said each segment and its slope and rate of change of slope at the start of said each segment.

2. The method according to claim 1 wherein the size of each stored pattern may be changed by a fixed scale factor by multiplying the length of said each segment by said fixed scale factor and dividing the rate of change of slope at the start of said each segment by said fixed scale factor.

* * * * *